(12) United States Patent
Saraiya et al.

(10) Patent No.: US 8,316,323 B2
(45) Date of Patent: Nov. 20, 2012

(54) BREADCRUMB NAVIGATION THROUGH HEIRARCHICAL STRUCTURES

(75) Inventors: Puravkumar B. Saraiya, Redmond, WA (US); Catherine Elizabeth Dumas, Bothell, WA (US); Stephen M. Danton, Seattle, WA (US); Balasubramanian Shyamsundar, Redmond, WA (US); Pravin R. Indurkar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 12/748,110

(22) Filed: Mar. 26, 2010

(65) Prior Publication Data

US 2011/0239164 A1    Sep. 29, 2011

(51) Int. Cl.
*G06F 3/00* (2006.01)

(52) U.S. Cl. ....................................... 715/853
(58) Field of Classification Search ............... 715/853
See application file for complete search history.

(56) References Cited

U.S. PATENT DOCUMENTS

| | | | | |
|---|---|---|---|---|
| 4,918,621 | A * | 4/1990 | Nado et al. | 706/51 |
| 5,917,492 | A * | 6/1999 | Bereiter et al. | 715/854 |
| 7,162,488 | B2 * | 1/2007 | DeVorchik et al. | 1/1 |
| 7,818,690 | B2 * | 10/2010 | Srivastava | 715/853 |
| 7,930,648 | B1 * | 4/2011 | Jaramillo | 715/790 |
| 2004/0034497 | A1 | 2/2004 | Shah et al. | |
| 2004/0205711 | A1 * | 10/2004 | Ishimitsu et al. | 717/116 |
| 2005/0132304 | A1 | 6/2005 | Guido et al. | |
| 2007/0234224 | A1 | 10/2007 | Leavitt et al. | |
| 2007/0250505 | A1 * | 10/2007 | Yang et al. | 707/7 |
| 2008/0270933 | A1 * | 10/2008 | Straw et al. | 715/781 |
| 2008/0282189 | A1 * | 11/2008 | Hofmann et al. | 715/793 |
| 2009/0007063 | A1 | 1/2009 | Szpak et al. | |
| 2009/0063547 | A1 | 3/2009 | Wright et al. | |
| 2009/0106238 | A1 * | 4/2009 | Lita et al. | 707/5 |
| 2009/0164939 | A1 * | 6/2009 | Ishimitsu et al. | 715/805 |
| 2009/0222547 | A1 * | 9/2009 | Boylan et al. | 709/223 |
| 2009/0300326 | A1 * | 12/2009 | Sweeney | 712/28 |
| 2010/0049766 | A1 * | 2/2010 | Sweeney et al. | 707/737 |
| 2011/0145690 | A1 * | 6/2011 | Hofmann et al. | 715/227 |

OTHER PUBLICATIONS

Navigation FAST Pack User Guide—Published Date: 2009 http://download.softpress.com/downloads/Navigation_Pack_User_Guide.pdf (28 pages).
Are SharePoint Breadcrumbs completely wrong?—Published Date: May 2, 2008 http://www.novolocus.com/tag/breadcrumbs/ (11 pages).
ShearerSite Template System—Published Date: Apr. 19, 2008 http://www.shearersoftware.com/software/web-tools/ShearerSite/ (3 pages).
Navigation in School Atlases: Functionality, Design and Implementation in the "Swiss World Atlas Interactive"—Published Date: 2009 http://www.schweizerweltatlas.ch/downloads/publikationen/2009_icc-1.pdf (10 pages).
Manage sites and site collections—Retrieved Date: Jan. 27, 2010 http://www.nirma.org/_layouts/help.aspx?lcid=1033&cid0=MS.WSS.manifest&tid=MS.WSS.HA10157781 (5 pages).

\* cited by examiner

*Primary Examiner* — Ryan Pitaro
(74) *Attorney, Agent, or Firm* — Workman Nydegger

(57) ABSTRACT

A viewer may be used to navigate through diagrammatic views of hierarchically structured documents. Expansion and collapse controls may be used to show or hide details regarding a particular node in the hierarchy. Furthermore breadcrumb navigation may be employed to show and hide details regarding the ancestral chain for a particular node in the hierarchy.

19 Claims, 12 Drawing Sheets

BREADCRUMB NAVIGATION THROUGH HEIRARCHICAL STRUCTURES

BACKGROUND

Documents are often drafted in a hierarchically structured way in which portions of the document represents nodes in a hierarchy, and there is some convention for recognizing inter-relationships between the nodes. Organization into some hierarchical structure is helpful as it enables data to be more effectively organized and identified within the document. That is one of the driving motivations for the development of eXtensible Markup Language or XML. As an example, there have even been standards for the definition of application programs based on hierarchically structured documents. One such standard is referred to as eXtensible Application Markup Language (XAML).

However, such hierarchically structured documents can become quite complex and cumbersome to deal with as the number of nodes in the hierarchy increase. However, increased nodes are often required to deal with complex data such as, for example, a complex XAML document that describes a sophisticated software program.

BRIEF SUMMARY

At least one embodiment described herein relates to a viewer that may be used to navigate through diagrammatic views of hierarchically structured documents. Expansion and contraction controls may be used to show or hide details regarding a particular node in the hierarchy. Furthermore, breadcrumb navigation may be employed to show and hide details regarding the ancestral chain for a particular node in the hierarchy.

Further optional features employ expand-all and collapse-all features with respect to a focus node, which in combination with specific node expansion and collapsing, may be used to quickly view the nodes and details of interest in the hierarchy. Expansion and collapsing state may be persisted in some circumstances to allow for an intuitive restoration of the prior view after an expand-all or collapse-all operation. Expansion and collapsing state may also be persisted across viewer sessions, and may even be persisted within the hierarchically structured document itself.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a viewer may be used to navigate through diagrammatic views of hierarchically structured documents. Expand and collapse controls may be used to show or hide details regarding a particular node in the hierarchy. Furthermore breadcrumb navigation may be employed to show and hide details regarding the ancestral chain for a particular node in the hierarchy.

Further optional features employ expand-all and collpase-all features with respect to a focus node, which in combination with specific node expansion and contraction, may be used to quickly view the nodes and details of interest in the hierarchy. Expansion and collapsed state may be persisted in some circumstances to allow for an intuitive restoration of the prior view after an expand-all or collapse-all operation. Expansion and collapsed state may also be persisted across viewer sessions, and may even be persisted within the hierarchically structured document itself. The viewer may also be an editor. In that case, as nodes are added to the hierarchy using the editor, the expansion state of the node may perhaps depend on the expansion state of the node or hierarchy into which the node is added.

The viewer/editor described herein provides for efficient and intuitive navigation through any hierarchy. One type of hierarchically structured document is a XAML document that describes functional software that, after proper compilation and/or interpretation, may be executed by a computing system. For instance, the software might be a workflow. However, the principles described herein are broad and encompass the navigation through any hierarchically structured document.

First, some introductory discussion regarding computing systems will be described with respect to FIG. 1. Then, an abstract discussion of hierarchically structured documents will be described with respect to FIG. 2. Then, an example usage of a hierarchically structured document will be described with respect to FIG. 3, in which the hierarchically structured document is interpreted and/or compiled, to thereby be executable by a computing system such as that of FIG. 1. Then, the functionality of the viewer/editor will be described with respect to a walkthrough referencing the user interfaces of FIGS. 4 through 12.

Figure 1:
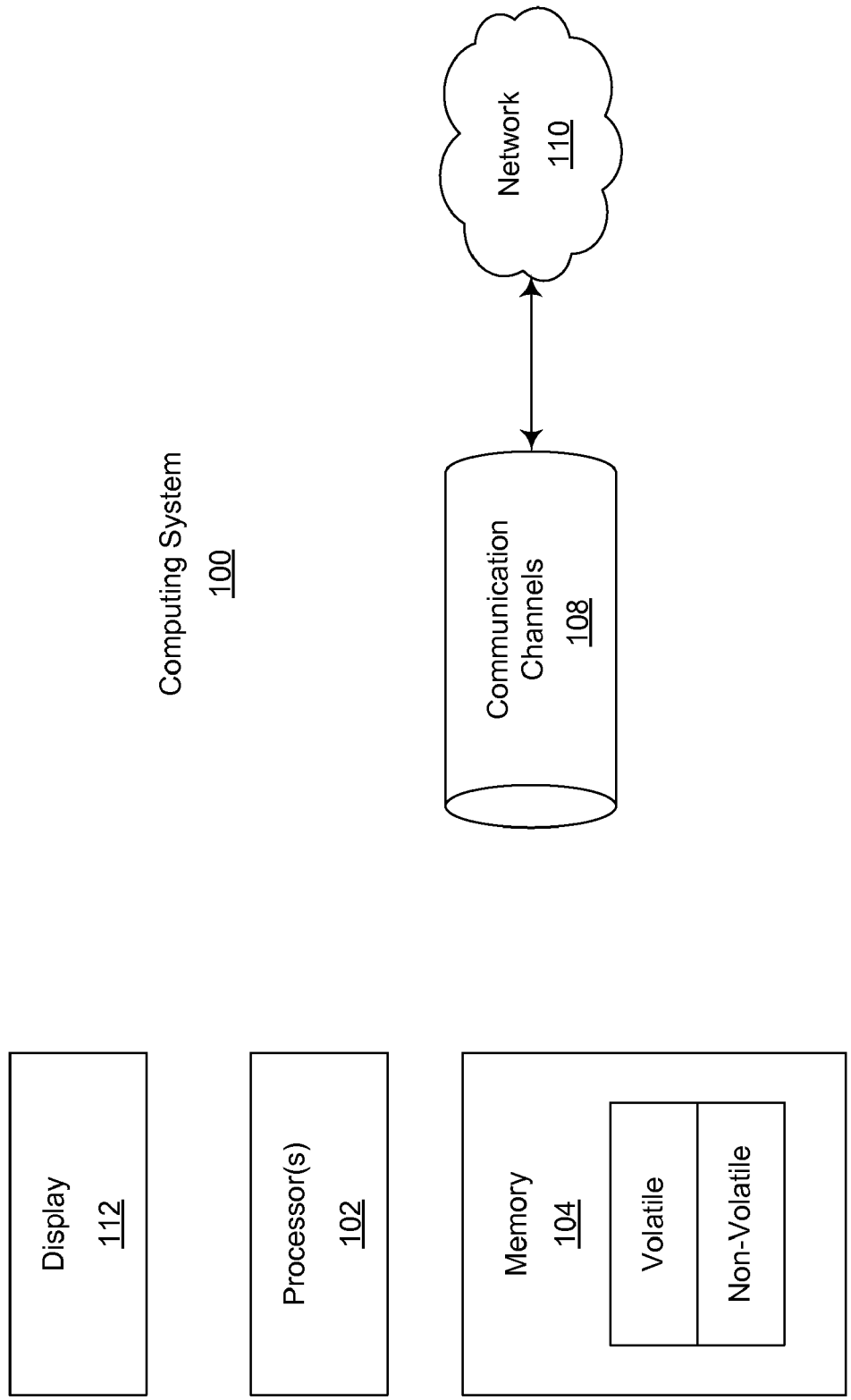
FIG. 1 illustrates an example computing system that may be used to employ embodiments described herein.

First, an introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

The computing system 100 may execute viewer/editor such as that to be described further herein. The computing system 100 may also have access to hierarchically structured document such as the example document described further herein.

Figure 2:
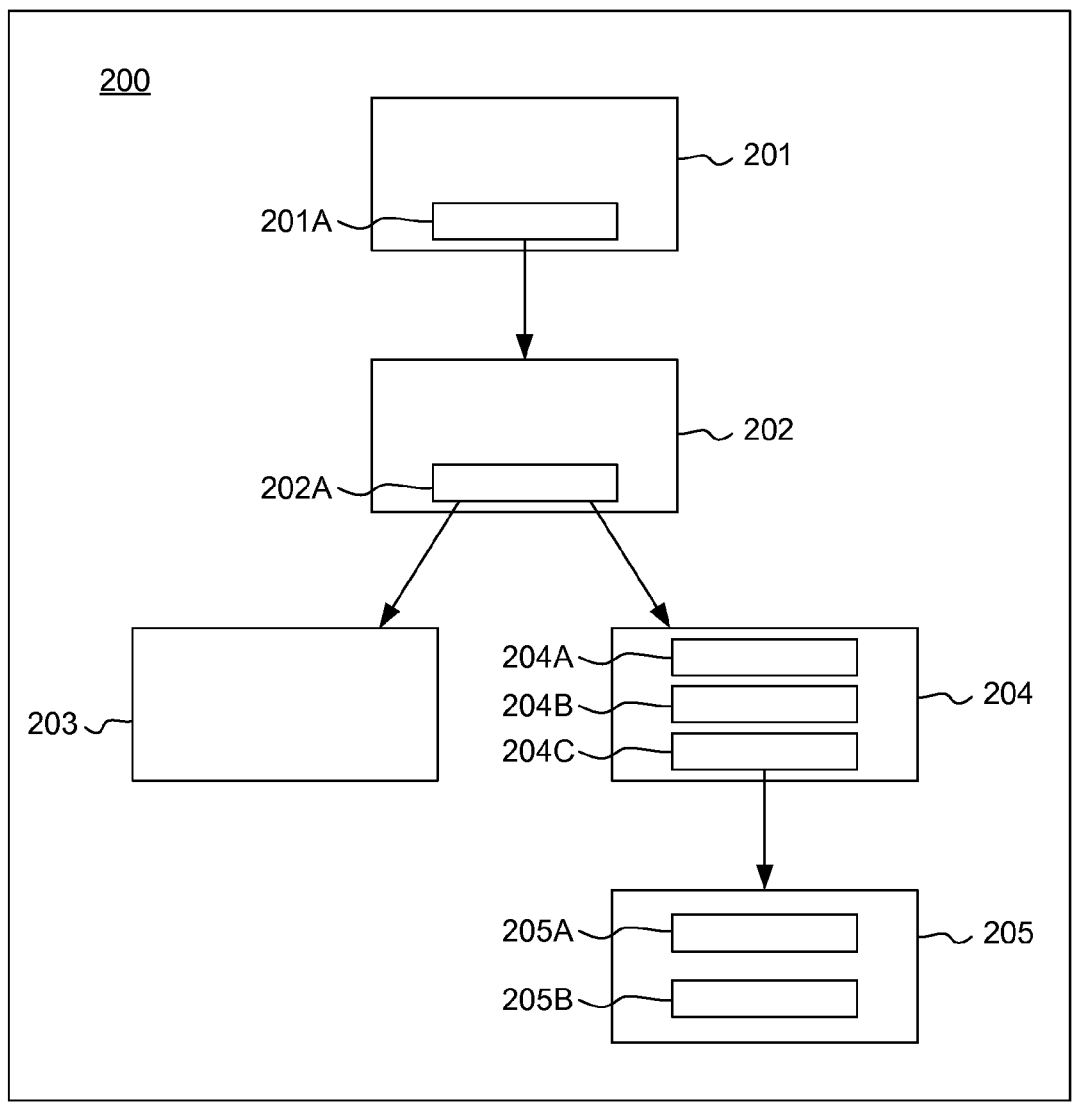
FIG. 2 abstractly illustrates an example hierarchically structured document that may be viewed by the viewer in accordance with the principles described herein FIG. 3 abstractly illustrates the document of FIG. 2 being compiled and/or interpreted to thereby become computer-executable instructions.

FIG. 2 abstractly illustrates a hierarchically structured document 200 that represents a certain hierarchy of nodes. The hierarchically structured document 200 is just a simple example in which there are four nodes in the hierarchy, including parent node 201, and child nodes 202 through 205. However, the principles described herein may apply to any hierarchy to provide an intuitive navigation experience through that hierarchy. In fact, the more complex the hierarchy, the more beneficial is the viewer described herein, as the viewer allows the user to quickly narrow in on the nodes and details of interest in even the most complex of hierarchies. The principles described herein are thus applicable to any hierarchy containing multiple interrelated nodes, in which each node may have a parent node (except of course the parent node itself) and zero or more child nodes.

Although not required, each of the nodes may have zero or more fields. For instance, node 201 contains field 201A; node 202 contains field 202A; node 203 has no fields; node 204 has three fields 204A, 204B, and 204C; and node 205 has two fields 205A and 205B. In this example, field 201A is a body field of node 201 and is defined as including node 202. Likewise, node 202A is a body field of node 202 and is defined as including nodes 203 and 204. Finally, node 204C is a body field of node 204 and is defined as including node 205. Thus, some fields define relationships with or more child nodes. Other fields define parameters of the node. For instance, fields 204A and 204B define properties of the node 204, and node 205A defines a property for node 205. Field 205B may be a body field for node 205 and thus may be used to add a child node relation to the node 205. Furthermore, body fields 201A, 202A and 204C may be further used to add additional child nodes for respective nodes 201, 202 and 204.

Figure 3:
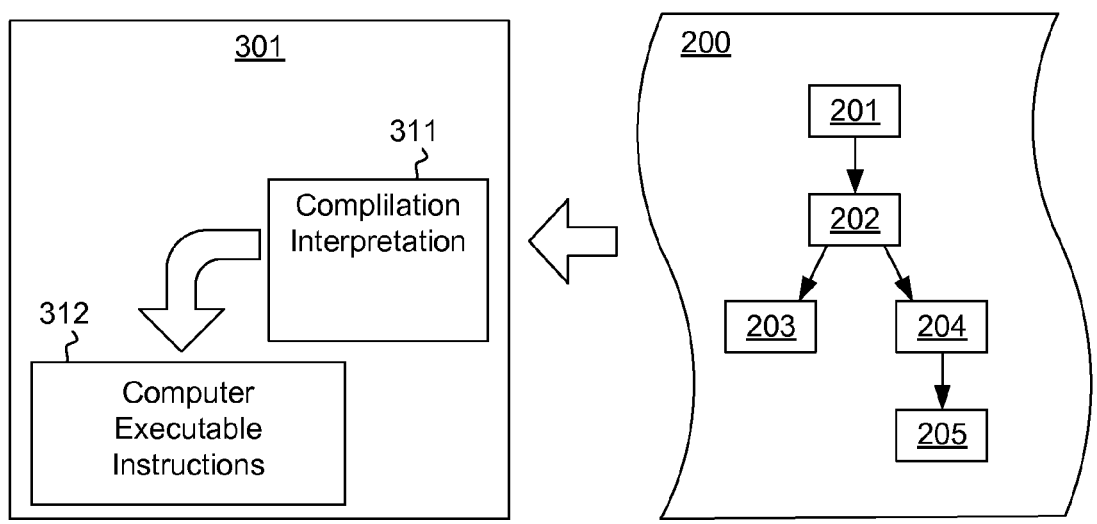

FIG. 3 illustrates one example usage 300 of a hierarchically structured document. In this case, the hierarchically-structured document 200 is provided to a computing system 301, where the document 200 undergoes one or more stages of compilation and/or interpretation 311 to cause the computing system to formulate computer-executable instructions 312 that may be executed by the computing system. One example of a standard for formulating hierarchical descriptions of computer programs is eXtensible Application Markup Language (or XAML). XAML is a standard for drafting application descriptions in eXtensible Markup Language (or XML) such that the XML may be interpreted and an application formulated at run-time or prior to run-time. XML is a standard often used for drafting hierarchically structured documents, although the principles described herein are not limited to the viewing and/or editing of documents that are based on XML or XAML.

The following is an XAML document that will be provided as an example only. The example is provided realizing that the principles described herein are not limited to any specific type or structure for the hierarchically structured document, but recognizing that an example can be helpful in understanding the broader principles described herein. The example XAML document is as follows with line numbering added for clarity:

example of the node 202 of FIG. 2, and will be interpreted to be the child of the sequence activity due to its nested position within the sequence activity.

The parallel activity includes a first child activity that is represented wholly at line 14. The delay activity represents an example of the node 203 of FIG. 2. This first activity is a delay activity and will be interpreted to be the child of the parallel activity due to its nested position within the parallel activity.

The parallel activity also includes a second child activity, a "For Each" activity that extends from lines 15 through 28. The For Each activity represents an example of the node 204 of FIG. 2, and will be interpreted to be the child of the parallel activity due to its nested position within the parallel activity. Line 19 indicates whether the expand or collapse state was explicitly set by the user. If the value of line 19 were set to "true", this indicates that the user manually collapsed the activity by interacting with the visualization of the activity. In that state, should the user select to restore the activity, this forces the expand state for the activity to revert to the state specified in line 18, regardless of the previous global state of the activity. Thus, a value of "false" in line 19 indicates that

```
1. <Activity [Appropriate Namespace Declarations Inserted Herein]>
2.     <WorkflowViewStateService.ViewState>
3.         <Dictionary TypeArguments="String, Object">
4.             <Boolean Key="ShouldExpandAll">True</Boolean>
5.         </Dictionary>
6.     </WorkflowViewStateService.ViewState>
7.     <Sequence XamlDebuggerXmlReader.FileName=[Insert FileName]>
8.         <WorkflowViewStateService.ViewState>
9.             <Dictionary TypeArguments="String, Object">
10.                <Boolean Key="IsExpanded">True</Boolean>
11.            </Dictionary>
12.        </WorkflowViewStateService.ViewState>
13.        <Parallel>
14.            <Delay/>
15.            <ForEach TypeArguments="x:Int32">
16.                <WorkflowViewStateService.ViewState>
17.                    <Dictionary TypeArguments="String, Object">
18.                        <Boolean Key="IsExpanded">False</Boolean>
19.                        <Boolean Key="IsPinned">False</Boolean>
20.                    </Dictionary>
21.                </WorkflowViewStateService.ViewState>
22.                <ActivityAction TypeArguments="Int32">
23.                    <ActivityAction.Argument>
24.                        <DelegateInArgument TypeArguments="Int32" Name="item" />
25.                    </ActivityAction.Argument>
26.                    <While />
27.                </ActivityAction>
28.            </ForEach>
29.        </Parallel>
30.    </Sequence>
31. </Activity>
```

The document extends from lines 1 through 31. Lines 2 through 6 represent certain properties of the document. In particular, line 4 in this context indicates that the view of the document should expand all of the nodes upon opening. Thus, prior state regarding the expansion properties of the document as a whole are preserved within the document itself.

Lines 7 through 30 represent a sequence activity, and is an example of the node 201 of FIG. 2. Line 10 is once again a persisted expansion state, and indicates that this sequence should be expanded upon opening. The editor may change this setting at some point in response to user interaction with the editor.

The sequence activity contains a child parallel activity that extends from lines 13 through 29. The parallel activity is an the user has not manually interacted with the visualization of the activity to cause the present visualization.

The For Each activity includes a child while activity that is represented wholly at line 26. The while activity represents an example of the node 205 of FIG. 2. This while activity will be interpreted to be the child of the For Each activity due to its nested position within the For Each activity.

The viewer/editor described herein need not actually execute the hierarchical document 200, but does provide a view of the hierarchical document such that the document can be easily navigated through. A walkthrough of one example of the operation of the viewer/editor will be described with respect to FIGS. 4 through 12.

Figure 4:
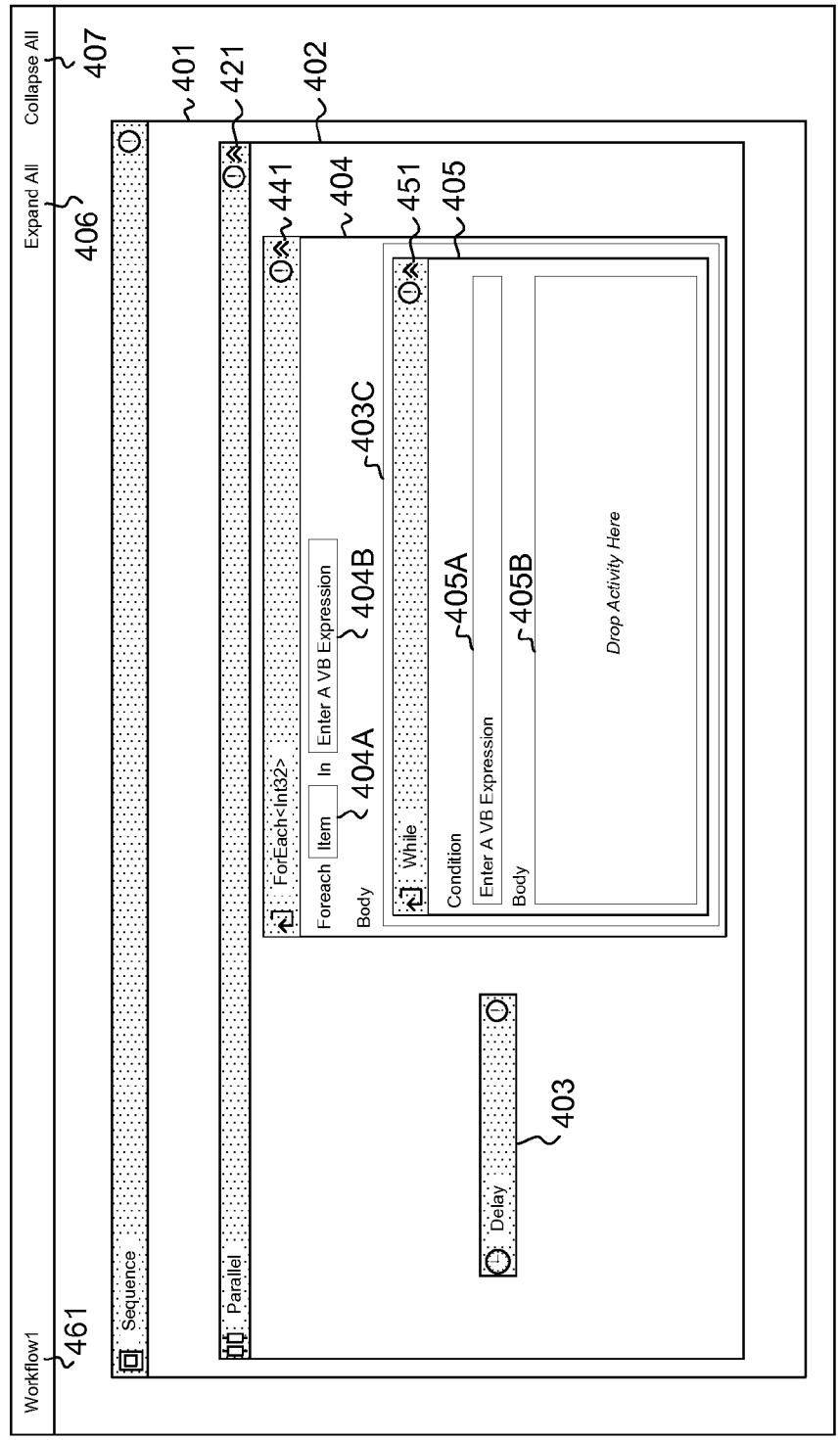
FIG. 4 illustrates an initial user interface used in a walk-through constituting nine stages.

FIG. 4 illustrates a first user interface 400 that represents a beginning point for the walkthrough. The user interface 400 illustrates the hierarchical document represented by the XAML document described above. In this case, each node in the hierarchical document (i.e., an activity in the document in this example) is represented by a window. For instance, a sequence window 401 represents the sequence activity. In this initial state, the visualization is completely expanded in that each window associated with each activity is viewable, along with all of the property fields of the activity.

The parallel window 402 represents the parallel activity. The fact that a node (in the example an activity) is a child of another node (also an activity in the example) is represented visually in this example by the window representing the child node being included within the window representing the parent node. Thus, the parallel window 402 is included within the sequence window 401, since the parallel activity is the child of the sequence activity. Populated or unpopulated properties of a particular node are presented also within the corresponding window that represents the node, but outside any window that represents a child node of that particular node. Thus, in FIG. 4, since there are no properties within the sequence window that are not also in the parallel window, there are no properties of the sequence activity represented.

The delay window 403 represents the delay activity of the XAML example. The delay window 403 does not contain any properties and thus is represented only as a small window.

The For Each window 404 represents the For Each activity of the XAML example. The For Each window 404 shows two properties 404A and 404B (unpopulated in both cases) of the For Each activity. Properties 404A and 404B are examples of the fields 204A and 204B of FIG. 2. The body field 403C may contain one or more activities. In this case the body field 403C includes a while window 405.

The while window 405 represents the while activity of the XAML example. The while window 405 shows two fields. One field 405A is an expression field into which an expression may be inserted which is the condition for continuing the while activity. Once the condition is false, the while activity finishes executing. A body field 405B is shown empty with a mere prompt that an activity may be dropped within the body field 405B to create a child activity of the while activity.

The user interface 400 shows the hierarchy in a completely expanded state. Each of the windows (with a few exceptions) are collapsible to thereby hide details of the window. Those windows that are collapsible include a collapse control (two upward facing chevrons). The presence of a collapse control is also an indicator that the corresponding window is expanded.

For instance, parallel window 402 includes collapse control 421, For Each window 404 includes collapse control 441, and while window 405 includes collapse control 451. The delay window 403 does not have a collapse control because the delay window 403 has no content, and thus the collapse function has no meaning with respect to the delay window 403. In this embodiment, the parent window, the sequence window 401 also does not contain a collapse control. This is because the collapse of the parent window 401 may be achieved using the collapse all control 407, and thus providing a similar control at the parent window 401 would be redundant. The collapse controls 421 and 441 are examples of child detail controls that change the emphasis on the children and detail of the node in which the control is embedded. Specifically, the collapse controls 421 and 441, when selected, cause less emphasis to be placed on the children and detail of the corresponding node. In some cases, the child nodes are deemphasized to the point of having no visualization at all.

In the illustrated embodiment, the collapse control, when exercised at a particular window, causes all of the child windows contained within the particular window to disappear or at least be deemphasized. In the walkthrough embodiment, the properties of the particular window are also caused to disappear, although other embodiments may keep those properties visible even after a collapse operation. The expand-all control 406 and the collapse-all control 407 will be described further in the walkthrough. The breadcrumb navigation control 461 shows the ancestral chain of parent nodes that are currently hidden or otherwise deemphasized. In the case of FIG. 4, since all of the windows are shown for all of the underlying activities, there is no hidden ancestral chain. Accordingly, the control 461 defaults to the name of the hierarchical document, which is in this case "Workflow1".

Figure 5:
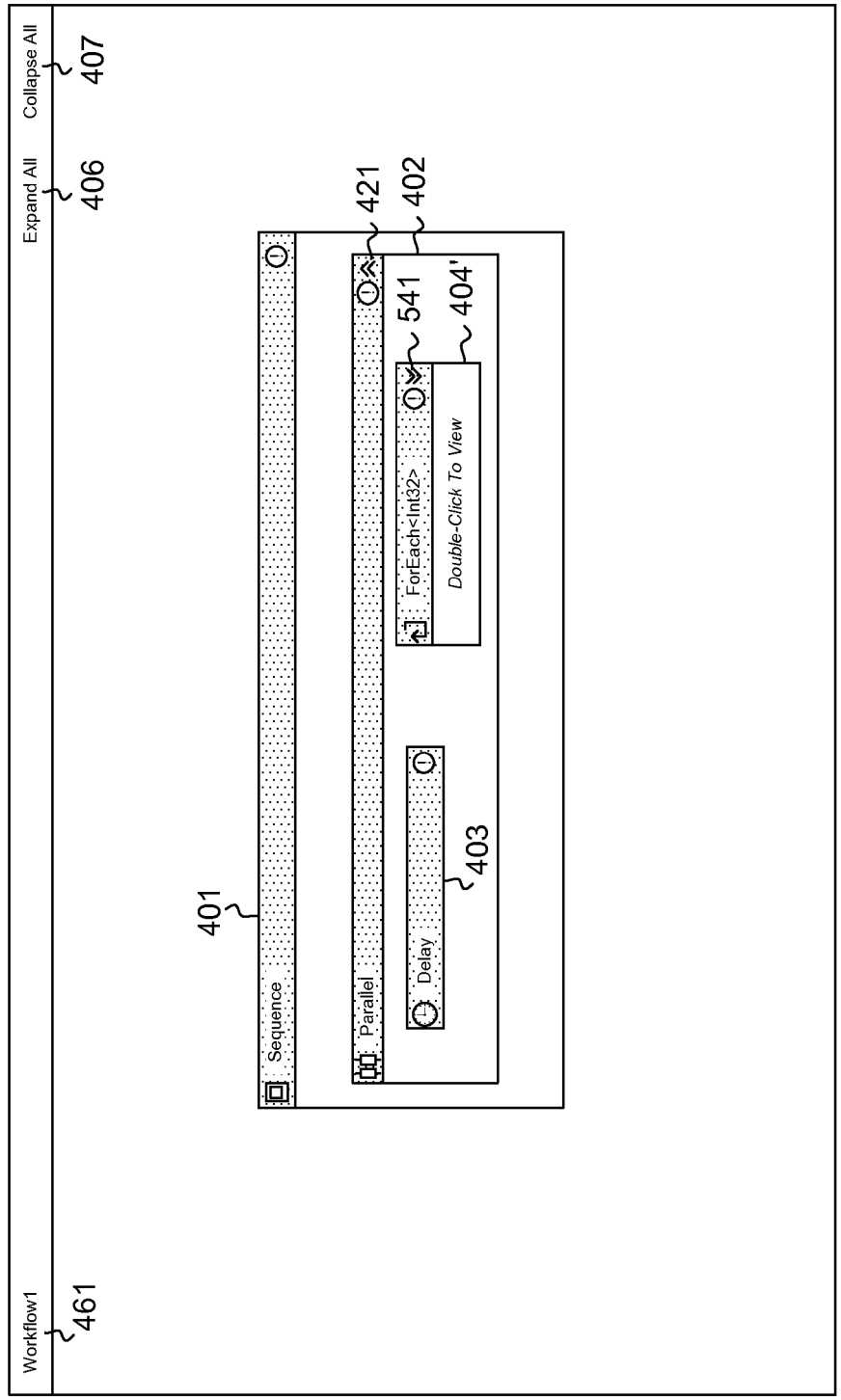
FIG. 5 illustrates the user interface of FIG. 4 with the parallel window being collapsed.

FIG. 5 illustrates a user interface 500 that represents a next state of the user interface 400 in the walkthrough. In particular, user interface 500 represents an example showing how the user can collapse one of the windows, in this case, the For Each window 404. In the user interface 400 of FIG. 4, the user selected the collapse control 441 of the For Each window 404 to generate the collapsed For Each window 404' of FIG. 5. The collapsing of the For Each window 404' has now hidden the child windows (i.e., the while window 405) of the For Each window. In addition, the properties of the For Each activity (i.e., the properties 404A and 404B) are also hidden. The result is a much less congested representation of the underlying XAML document. In the case where the content of the For Each activity was simply not what the user was focused on at the point of time of the user interface 500 of FIG. 5, the user may thus be permitted to focus much better on the elements of interest in the hierarchically structured document.

The collapsed windows contain a control which serves both as a collapse indicator representing that the window is collapsed, as well as an expansion control that the user may operate to expand the window (e.g., to show the children windows and potentially also the properties of the window). For instance, in FIG. 5, the collapse control 441 of FIG. 4 has been replaced by an expansion control 541 (represented by two downward facing chevrons). The collapse control 421 for the parallel window 402 remains since it is still considered expanded in that its child windows are still visible in some form. The expansion control 541 is also an example of child detail control that changes the emphasis on the children and detail of the node in which the control is embedded. Specifically, the expansion control 541, when selected, causes more emphasis to be placed on the children and detail of the corresponding node.

Figure 6:
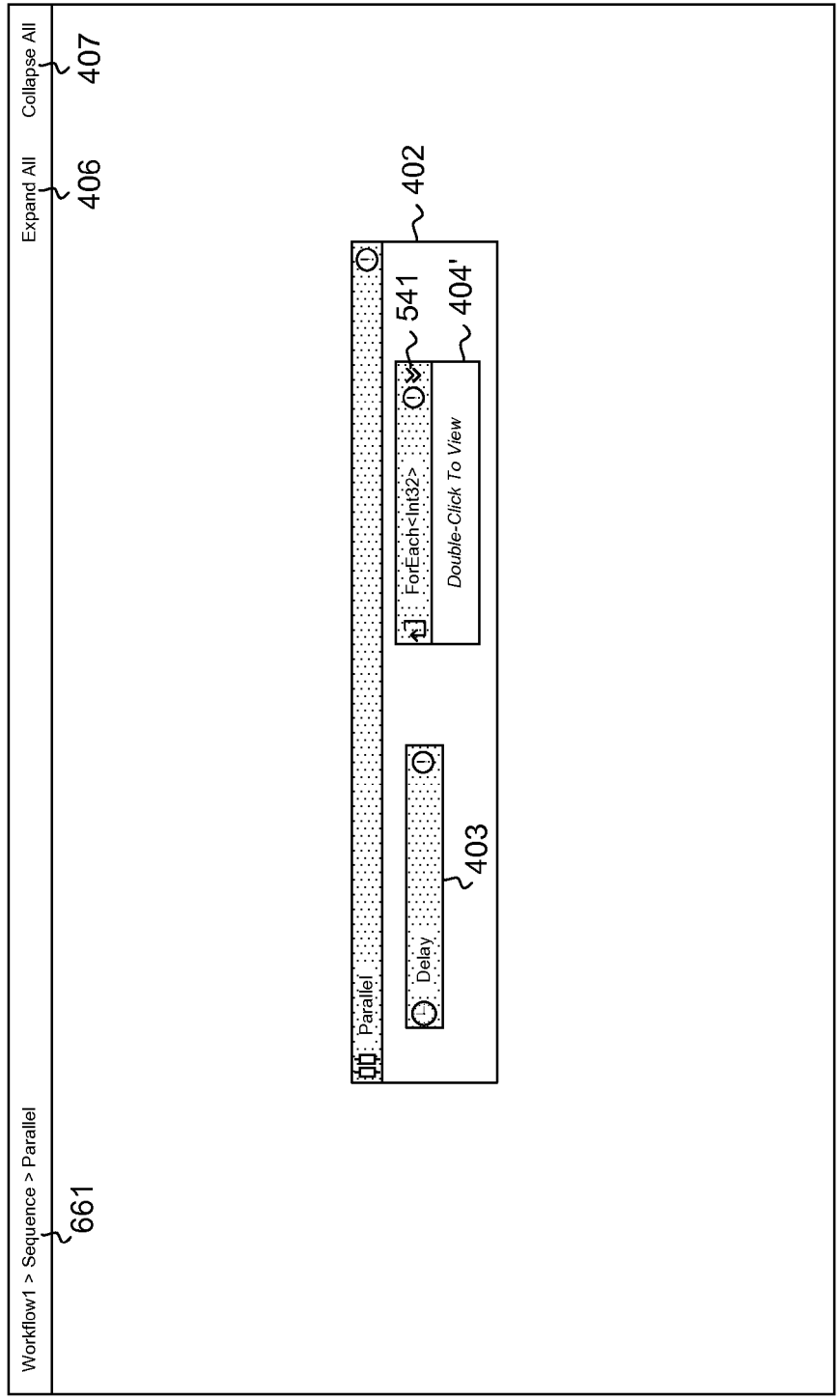
FIG. 6 illustrates the user interface of FIG. 5 except with the sequence window being deemphasized and breadcrumbed.

FIG. 6 illustrates a user interface 600 which represents a subsequent stage in the walkthrough after the user interface 500 of FIG. 5. In particular, the user interface of FIG. 6 is arrived at by double clicking on the parallel window. While the collapse and expansion function applied to a window of a particular node has the effect of hiding the descendent chains of that particular node, the user interface 600 shows that the ancestral chain of a particular window may also be hidden.

In particular, since the window 402 was double clicked on, the parent window 401 disappears. The breadcrumb control 461 of FIGS. 4 and 5 is thus modified to breadcrumb control 661. The breadcrumb control 661 shows the path that represents the hidden ancestral chain. In this case, the breadcrumb control 661 represents that the sequence window is hidden. To return to the user interface 500 of FIG. 5, the user might select the "sequence" text in the breadcrumb control 661. Thus, the breadcrumb control gives a visual indicator summarizing the path of the hidden ancestral chain, as well as a control for returning all or a portion of the ancestral chain back into visualization to thereby once again render the corresponding window for the ancestor. The double clicking control on any of the windows is an example of a parent detail control that changes the emphasis on the one or more parent nodes in the ancestral chain of the selected node in which the control is embedded. Specifically, the double clicking on the window 402 causes the parent nodes of the corresponding node to be deemphasized such that it is visualized only by the breadcrumb control 661.

Note that the For Each window 404' is still collapsed. Thus, the expansion state from the prior activity was preserved. Also, if the sequence control within the breadcrumb control 661 is selected, this will result in the user interface 500 of FIG. 5, thereby preserving the collapsed state of the For Each window 404'. Thus, this provides an intuitive mechanism for the user to hide particular parent or child nodes allowing the user to quickly navigate to nodes of interested, and deemphasize or hide nodes of lesser interest. As interests change, other portions of the hierarchy may be quickly navigated to, once again deemphasizing or hiding nodes that have become of lesser interest.

Figure 7:
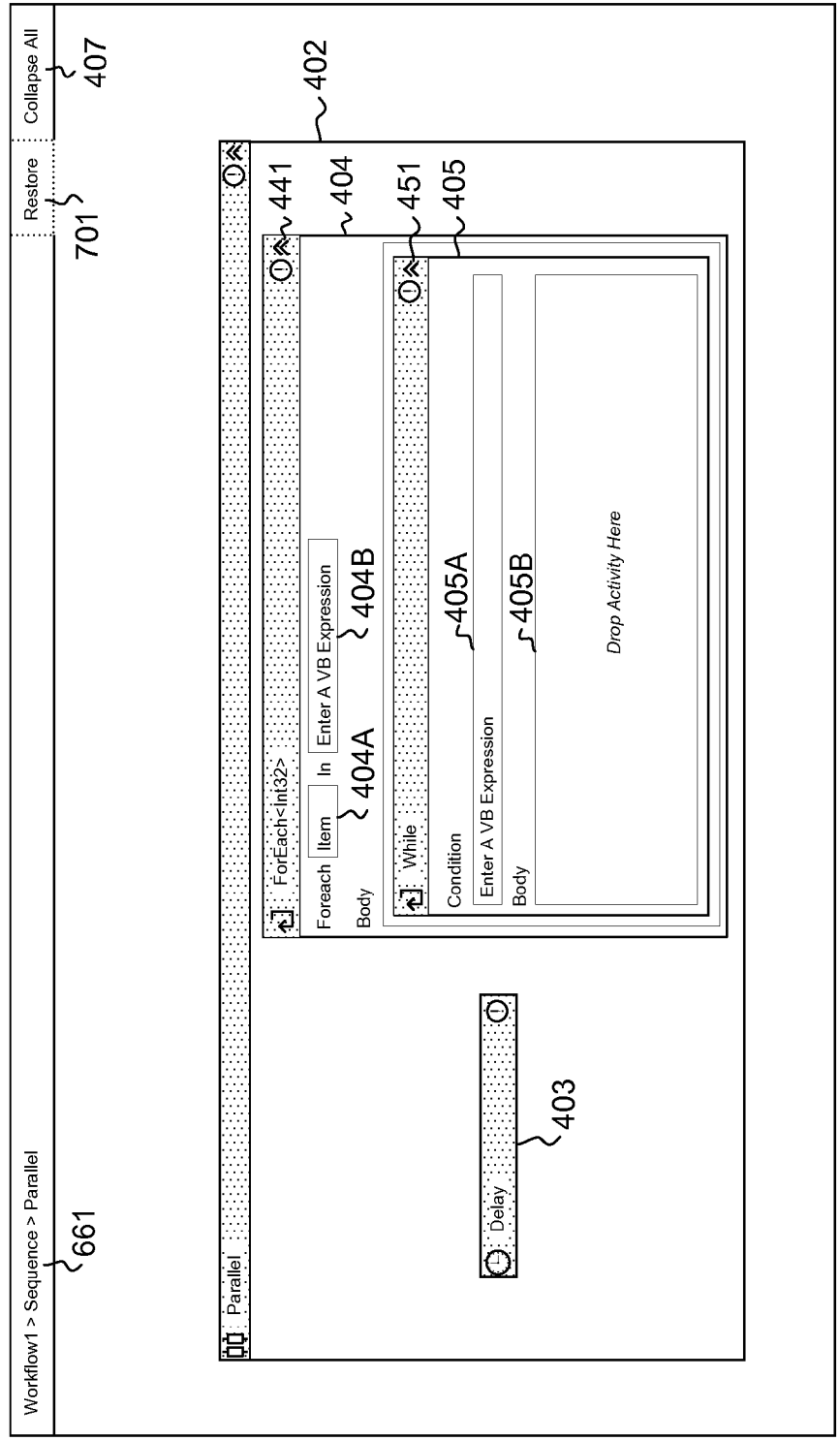
FIG. 7 illustrates a user interface of FIG. 6 except with the expand-all control activated.

FIG. 7 illustrates a user interface 700 that represents a next stage of the walkthrough after the user interface 600. In particular, the user interface 700 is arrived at by the user selecting the expand-all control 406 of FIG. 6. This has the effect of expanding all of the descendent nodes with respect to the breadcrumb control 661. For instance, since the breadcrumb control 661 shows the parallel window as being the most senior visualized window in FIG. 6, the exercise of the expand-all control 406 of FIG. 6 results in the user interface 700 of FIG. 7, in which all of the details and descendent windows of the parallel window are once again fully expanded. In particular, windows 403, 404 and 405 regain their visualizations shown in FIG. 4.

When the expand-all control 406 of FIG. 6 was selected, all of the expansion state for each of the windows in FIG. 6 was preserved, although not visualized in the user interface 700 of FIG. 7, and the expand-all control 406 was replaced by a restore control 701. Note that although the user interface 700 of FIG. 7 is shown after an expand-all operation, the individual windows can still be collapsed using collapse controls 441 and 451 for respective windows 404 and 405. Thus, through a combination of expand-all, followed by individual window collapse operations, the details that are not of interest can be quickly deemphasized. Furthermore, should the visualization just prior to the expand-all exercise be desired, the restore control 701 may be selected to arrive back at the user interface 600 of FIG. 6 since, as previously mentioned, the expansion state was preserved in concordance with the expand-all operation. In one embodiment, if any individual expansion state has been changed since selecting the expand-all using any of the individual expand or collapse controls, the visualization may optionally retain such state when restored.

Figure 8:
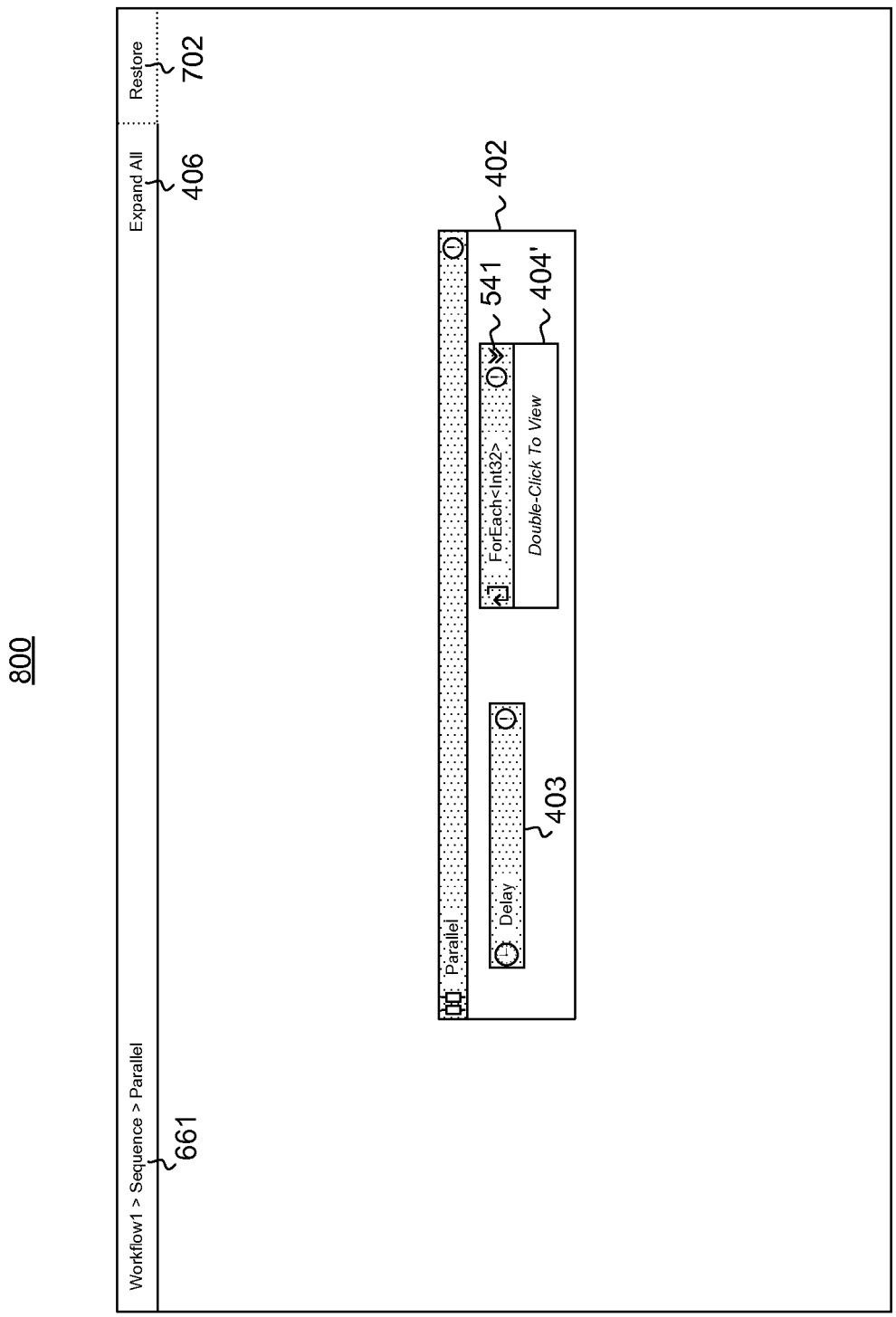
FIG. 8 illustrates a user interface of FIG. 7 except with the collapse-all control activated.

FIG. 8 illustrates a user interface 800 that represents a next stage of the walkthrough after the user interface 700. In particular, the user interface 800 is arrived at by the user selecting the collapse-all control 407 of FIG. 7. This has the effect of collapsing all of the descendent nodes with respect to the breadcrumb control 661. For instance, since the breadcrumb control 661 of FIG. 7 shows the parallel window as being the most senior visualized window in FIG. 6, the exercise of the collapse-all control 407 of FIG. 7 results in the user interface 800 of FIG. 8, in which all of the details and descendent windows of the parallel window are collapsed.

When the collapse-all control 407 of FIG. 7 was selected, all of the expansion state for each of the windows in FIG. 7 was preserved, although not visualized in the user interface 800 of FIG. 8, and the collapse-all control 407 was replaced by a restore control 702. Note that although the user interface 800 of FIG. 8 is shown after a collapse-all operation, the individual windows can still be expanded using expand controls for each collapsed window. For instance, in FIG. 8, the expansion control 541 may be used to expand the window 404'. Thus, through a combination of collapse-all, followed by individual window expansion operations, the details that are not of interest can be quickly deemphasized. Furthermore, should the visualization just prior to the collapse-all exercise be desired, the restore control 702 may be selected to arrive back at the user interface 700 of FIG. 7 since, as previously mentioned, the expansion state was preserved in concordance with the collapse-all operation. In one embodiment, if any individual expansion state has been changed since selecting the collapse-all using any of the individual expand or collapse controls, the visualization may optionally retain such state when restored.

Figure 9:
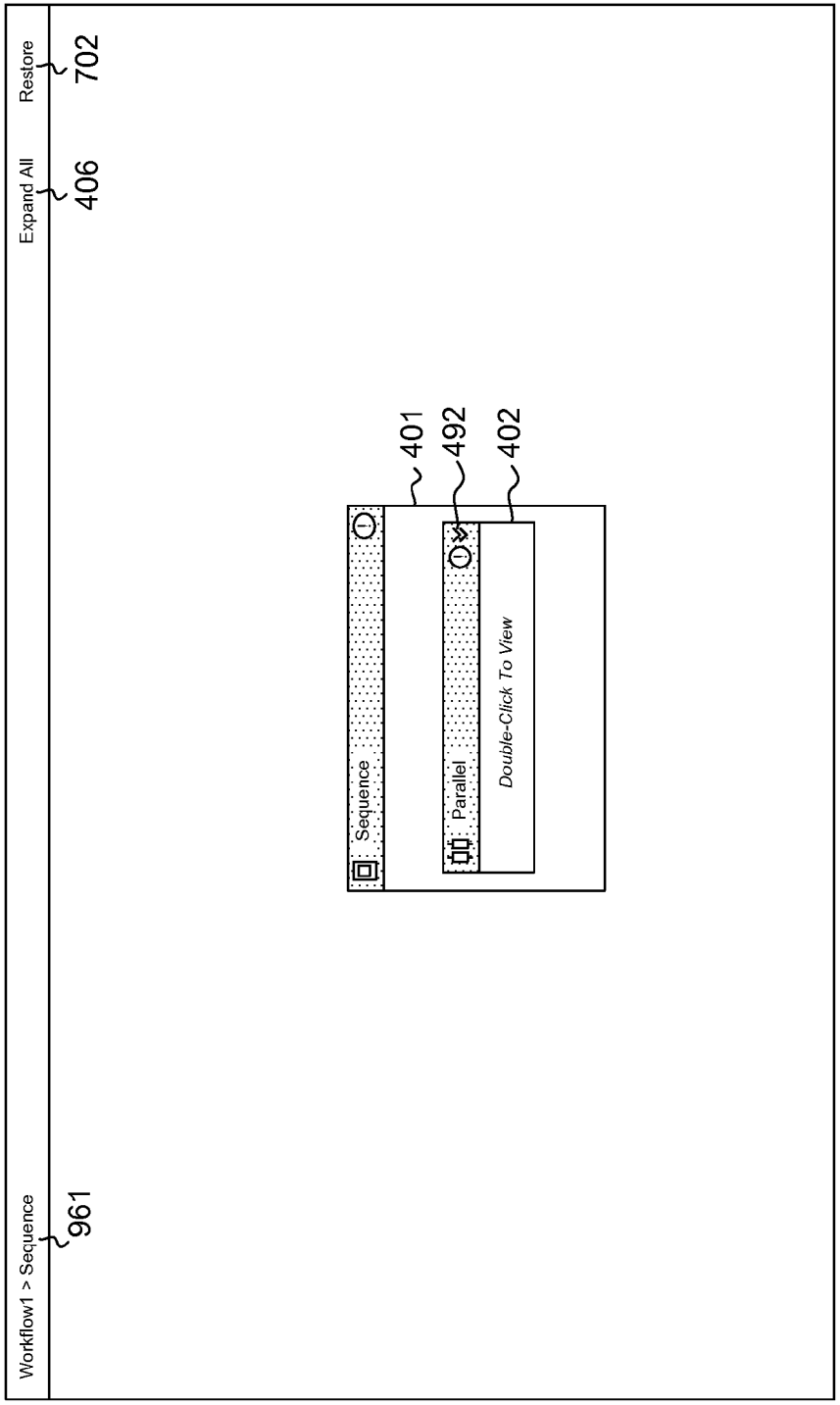
FIG. 9 illustrates a user interface of FIG. 8, except with the sequence window being returned using the breadcrumb control.

FIG. 9 illustrates a user interface 900 that represents the next stage of the walkthrough after the user interface 800 of FIG. 8. The user interface 900 of FIG. 9 is obtained by selecting the sequence control of the breadcrumb control 661 of FIG. 8. This causes the sequence window 401 to once again be the most senior window in the visualization. The "collapse-all" state of the visualization remains. Thus the sequence window 401 is shown in collapsed state. Here, the parallel window 402 includes an expansion control 492 that may be selected to expand the parallel window 402. The breadcrumb control 961 has been changed to reflect that the sequence window is now the most senior visualized window. The breadcrumb control 661 is an example of a parent detail control that changes the emphasis on the one or more parent nodes in the ancestral chain of the selected node in which the control is embedded. Specifically, the activation of the breadcrumb control 661 causes the parent nodes of the corresponding node to be reemphasized such that it is only visualized by a window.

Each time the document is saved, the expansion view state may be preserved in the document itself. Thus, the next time the document is opened, the viewer may interpret the prior view state, and present the view of the document that the user had last left the document in. This provides the user with continuity, and saves the user time having to get back to the same position as before. For instance, in the XAML example above, the expansion state is represented by 4, 10, 18 and 19.

Figure 10:
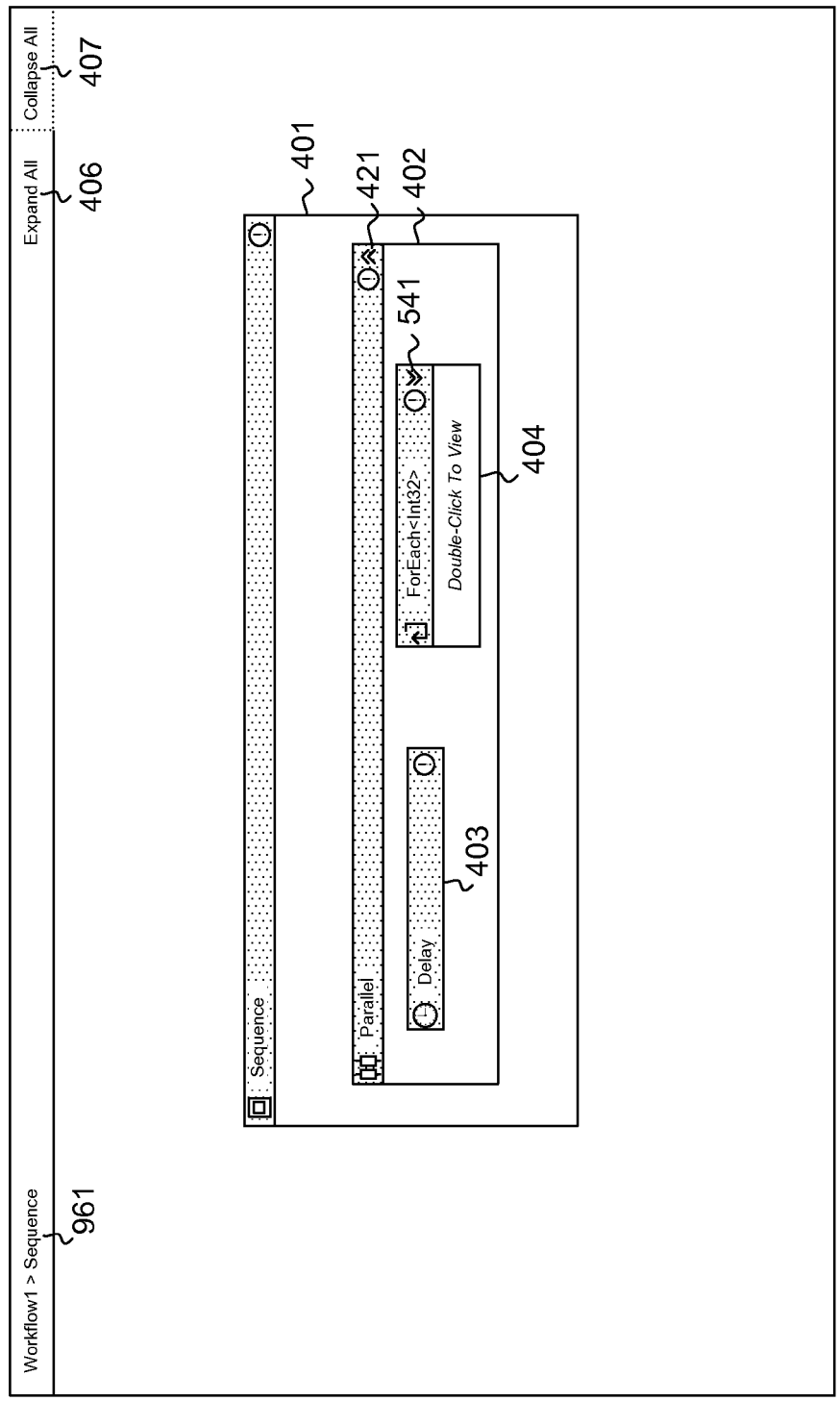
FIG. 10 illustrates a user interface after the restore feature is employed to return to the state of FIG. 5.

FIG. 10 illustrates a user interface 1000 that represents a subsequent stage in the walkthrough after user interface 900 of FIG. 9. The user interface 1000 may be arrived at by selecting the restore control 702 of FIG. 9. The user interface 1000 shows that the expand/collapse state set by the user interfacing with the activity is preserved after selecting restore. In other words, the "IsPinned" state is respected.

Figure 11:
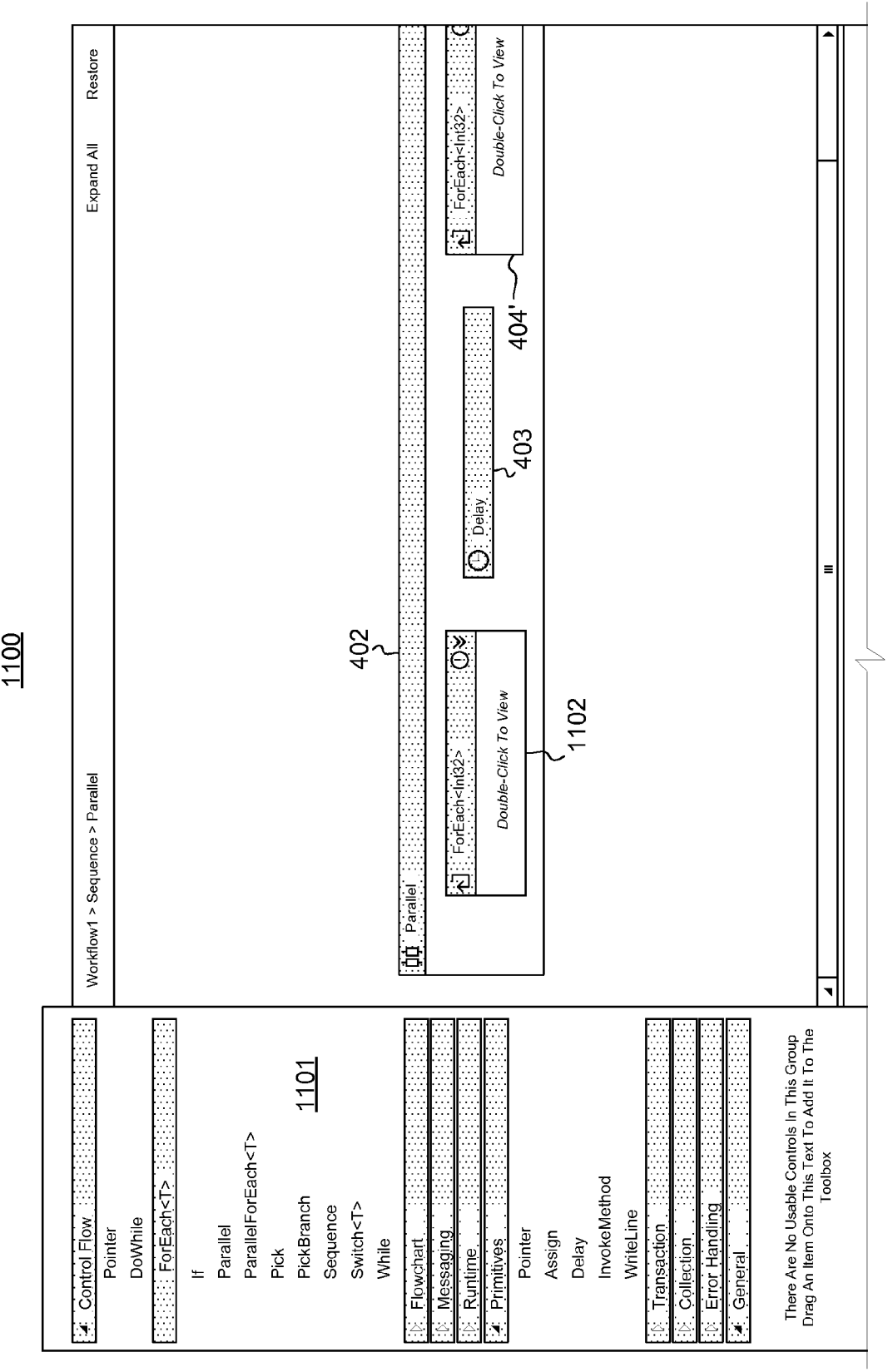
FIG. 11 illustrates a user interface in which a new activity is being added to a previously collapsed activity.

FIG. 11 illustrates a user interface 1100 that shows how an activity might be added to, for example, the user interface 800. Here, the user selects an activity (a For Each activity) from a toolbox 1101 and drags a For Each window 1102 into the parallel window 402. Here, since the parent window into which the new window was inserted (i.e., in this case, the parallel window 402) is in a collapsed state, the new For Each window 1102 is also created in the collapsed state.

Figure 12:
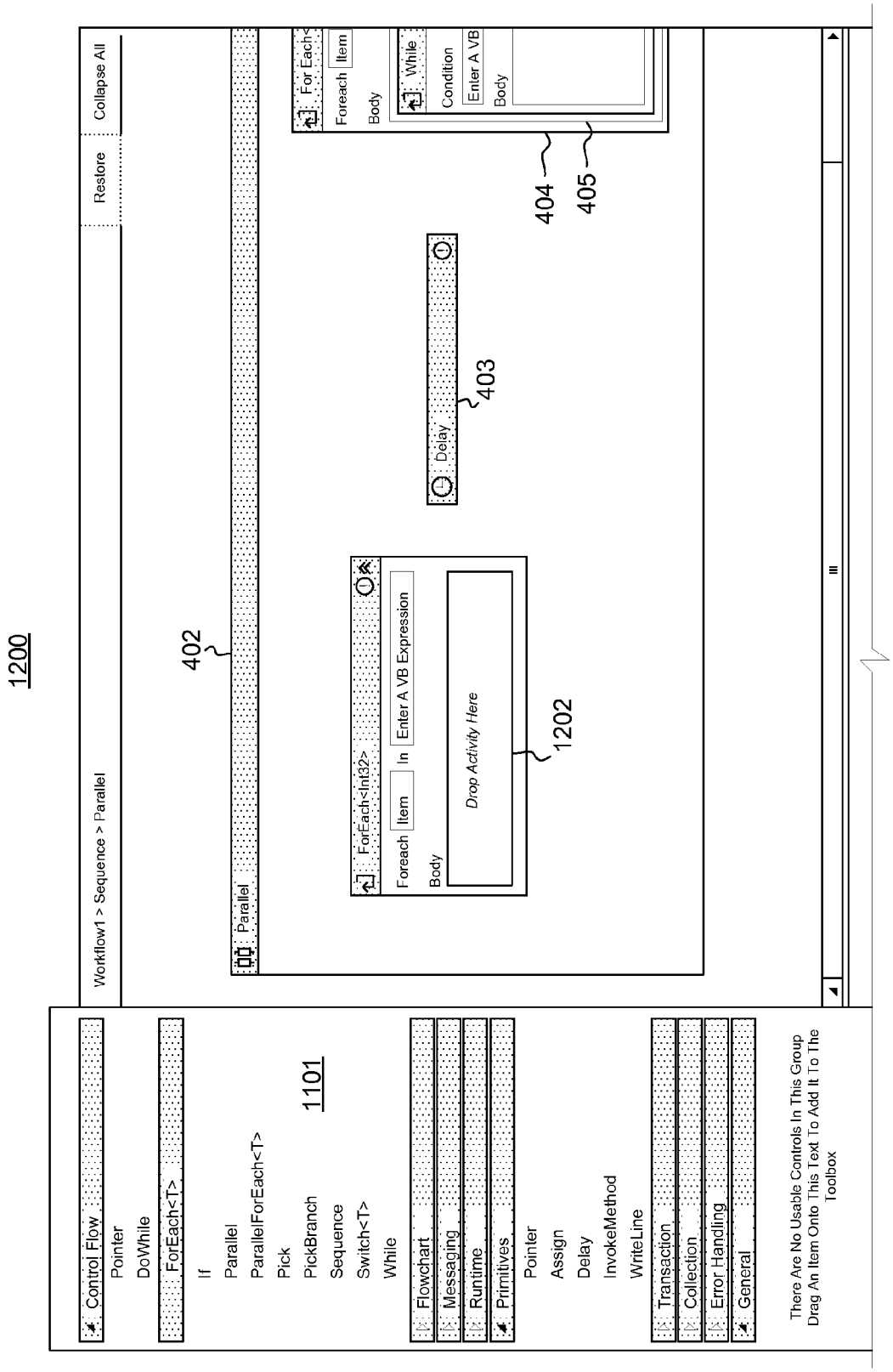
FIG. 12 illustrates a user interface in which a new activity is being added to a previously expanded activity.

FIG. 12 illustrates a user interface 1200 that shows how an activity might be added to, for example, the user interface 700. Here, the user selects an activity from a toolbox 1101 and drags a For Each window 1202 into the parallel window 402. Here, since the parent window into which the new window was inserted (i.e., in this case, the parallel window 402) is in an expanded state, the new For Each window 1202 is also created in the expanded state. Thus, FIGS. 11 and 12 demonstrate that whether newly created windows and nodes are created in expanded or collapsed form, may depend on the context of the expanded or expanded state of one or more windows of the previous visualization.

Thus, the principles described herein provide an effective viewer and editor for conveniently and efficiently navigating through a visualization of a hierarchical document. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable media having thereon computer-executable instructions that, when executed by one or more processors of a computing system, cause a computing system to perform a computer-implemented method for diagrammatically navigating and viewing the nodes of a hierarchically structured document, the method comprising the following acts:
   displaying at a graphical user interface of a computing system a hierarchical visualization of multiple nodes in a hierarchically structured document, the hierarchical visualization comprising in a first view a plurality of windows with each window representing a node in the hierarchy of the hierarchically structured document, with some windows representing parent nodes in the hierarchy in relation to one or more child nodes in the hierarchy, and the child nodes being displayed within the window of their corresponding parent node;
   providing at one or more of the child windows a detail control that may be used to expand or collapse the visualization of a selected child node so that
      (i) when the detail control is used to expand the selected child node, the one or more child windows are fully opened within the window of the selected child node so as to display within each fully opened window all fields showing parameters of the node for that fully opened window and fields showing relationships with any child nodes of the node for that fully opened window, and
      (ii) so that when the detail control is used to collapse the selected child node, the one or more child windows are closed within the window of the selected child node; and
   providing at one or more of the parent windows a detail control that may be used to expand or collapse the visualization of a selected parent node so that
      (i) when the detail control is used to expand the selected parent node, one or more parent windows are opened outside of the window of the selected parent node so as to display the selected parent node within the one or more parent windows that are opened, and
      (ii) so that when the detail control is used to collapse the selected parent node, the one or more parent windows of the selected parent node are closed.

2. The computer program product in accordance with claim 1, wherein at some nodes of the hierarchy are both parent and child nodes are the same node of the hierarchical structured document.

3. The computer program product in accordance with claim 1, wherein the hierarchically structured document is a XAML document.

4. The computer program product in accordance with claim 1, wherein the multiple nodes each represent an activity of a workflow.

5. The computer program product in accordance with claim 1, wherein said plurality of windows of the first view includes a first window that includes an expand all detail control that, when selected, allows all descendent nodes after the first window to be expanded.

6. The computer program product in accordance with claim 5, wherein when the expand all control is selected, the computer-executable instructions further cause the computing system to perform an act of persisting a prior state of the hierarchical visualization.

7. The computer program product in accordance with claim 5, wherein said first window includes a restore all detail control that, when selected, allows all of the descendant nodes after the first window to restore the hierarchical visualization to its prior persisted state.

8. The computer program product in accordance with claim 1, wherein said plurality of windows of the first view includes a first window that includes a collapse all control that allows all of the descendent nodes after the first window to be collapsed.

9. The computer program product in accordance with claim 8, wherein said first window includes a restore all detail control that, when selected, allows all of the descendant nodes after the first window to restore the hierarchical visualization to a prior persisted state.

10. The computer program product in accordance with claim 1, wherein said plurality of windows of the first view includes a first window that includes a breadcrumb navigation control that defaults in the first view to show the name of the hierarchical document.

11. The computer program product in accordance with claim 1, wherein a view state for at least some of the plurality of windows is persisted, the view state designating whether or not the at least some of the plurality of windows are expanded.

12. The computer program product in accordance with claim 11, wherein the view state is persisted within the hierarchically structured document itself.

13. The computer program product in accordance with claim 1, wherein the hierarchical visualization of the graphical user interface allows a user to add a node into the multiple nodes by providing a menu from which the node to be added is dragged and dropped to create a new window within an existing window for a node.

14. The computer program product in accordance with claim 13, wherein when a node is added to the hierarchical visualization, the window corresponding to the added node is automatically expanded or contracted depending on a view state of the existing window into which the node is dragged and dropped.

15. A computer-implemented method for diagrammatically navigating and viewing the nodes of a hierarchically structured document comprising the following acts:
   displaying at a graphical user interface of a computing system a hierarchical visualization of multiple nodes in a hierarchically structured document, the hierarchical visualization comprising in a first view a plurality of windows with each window representing a node in the hierarchy of the hierarchically structured document, with some windows representing parent nodes in the hierarchy in relation to one or more child nodes in the hierarchy, and the child nodes being displayed within the window of their corresponding parent node;

providing at one or more of the child windows a detail control that may be used to expand or collapse the visualization of a selected child node so that
  (i) when the detail control is used to expand the selected child node, the one or more child windows are fully opened within the window of the selected child node so as to display within each fully opened window all fields showing parameters of the node for that fully opened window and fields showing relationships with any child nodes of the node for that fully opened window, and
  (ii) so that when the detail control is used to collapse the selected child node, the one or more child windows are closed within the window of the selected child node;

providing at one or more of the parent windows a detail control that may be used to expand or collapse the visualization of a selected parent node so that
  (i) when the detail control is used to expand the selected parent node, one or more parent windows are opened outside of the window of the selected parent node so as to display the selected parent node within the one or more parent windows that are opened, and
  (ii) so that when the detail control is used to collapse the selected parent node, the one or more parent windows of the selected parent node are closed; and providing a breadcrumb navigation option to permit one or more parent windows of a selected child window to be hidden from the hierarchical visualization in order to simply the view for the selected child window.

16. The method of claim 15 further comprising persisting a view state for at least some of the windows in the hierarchical visualization, the view state corresponding to whether or not the at least some windows having the persisted view state are expanded or collapsed.

17. A computer system for diagrammatically navigating and viewing the nodes of a hierarchically structured document comprising:
  one or more processors;
  a graphical display connected to an input device for controlling input of user commands relative to the graphical display;
  one or more physical computer-readable media having stored thereon computer-executable instructions that, when executed by the one or more processors, cause the computing system perform a computer-implemented method comprising:
    instantiating at the display a graphical user interface that comprises a hierarchical visualization of multiple nodes in a hierarchically structured document, the hierarchical visualization comprising in a first view a plurality of windows with each window representing a node in the hierarchy of the hierarchically structured document, with some windows representing parent nodes in the hierarchy in relation to one or more child nodes in the hierarchy, and the child nodes being displayed within the window of their corresponding parent node;
    providing at one or more of the child windows a detail control that may be used to expand or collapse the visualization of a selected child node so that
      (i) when the detail control is used to expand the selected child node, the one or more child windows are fully opened within the window of the selected child node so as to display within each fully opened window all fields showing parameters of the node for that fully opened window and fields showing relationships with any child nodes of the node for that fully opened window, and
      (ii) so that when the detail control is used to collapse the selected child node, the one or more child windows are closed within the window of the selected child node; and
    providing at one or more of the parent windows a detail control that may be used to expand or collapse the visualization of a selected parent node so that
      (i) when the detail control is used to expand the selected parent node, one or more parent windows are opened outside of the window of the selected parent node so as to display the selected parent node within the one or more parent windows that are opened, and
      (ii) so that when the detail control is used to collapse the selected parent node, the one or more parent windows of the selected parent node are closed.

18. The computer system of claim 17 wherein the computer-executable instructions further comprise instructions for causing the computer implemented method to perform an act of providing a breadcrumb navigation option to permit one or more parent windows of a selected child window to be hidden from the hierarchical visualization in order to simply the view for the selected child window.

19. The computer system of claim 17 wherein the computer-executable instructions further comprise instructions for causing the computer implemented method to perform an act of persisting a view state for at least some of the windows in the hierarchical visualization, the view state corresponding to whether or not the at least some windows having the persisted view state are expanded or collapsed.

* * * * *

UNITED STATES PATENT AND TRADEMARK OFFICE
CERTIFICATE OF CORRECTION

PATENT NO. : 8,316,323 B2
APPLICATION NO. : 12/748110
DATED : November 20, 2012
INVENTOR(S) : Saraiya et al.

It is certified that error appears in the above-identified patent and that said Letters Patent is hereby corrected as shown below:

In the Specification

In column 2, line 34, delete "collpase" and insert -- collapse --, therefor.

In the Claims

In column 13, line 49, In Claim 17, after "system" insert -- to --.

Signed and Sealed this
Seventeenth Day of February, 2015

Michelle K. Lee
*Deputy Director of the United States Patent and Trademark Office*